US011102261B2

United States Patent
Moorthy et al.

(10) Patent No.: US 11,102,261 B2
(45) Date of Patent: Aug. 24, 2021

(54) DEVICES, SYSTEMS, AND METHODS FOR CONVERTING OR TRANSLATING DYNAMIC ADAPTIVE STREAMING OVER HTTP (DASH) TO HTTP LIVE STREAMING (HLS)

(71) Applicant: ARRIS Enterprises LLC, Suwanee, GA (US)

(72) Inventors: Praveen N. Moorthy, San Diego, CA (US); Haifeng Xu, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 1246 days.

(21) Appl. No.: 13/923,261

(22) Filed: Jun. 20, 2013

(65) Prior Publication Data

US 2014/0281009 A1    Sep. 18, 2014

Related U.S. Application Data

(60) Provisional application No. 61/785,864, filed on Mar. 14, 2013.

(51) Int. Cl.
| H04L 29/06 | (2006.01) |
| H04N 21/262 | (2011.01) |
| H04N 21/435 | (2011.01) |
| H04N 21/854 | (2011.01) |
| H04N 21/4402 | (2011.01) |
| H04N 21/845 | (2011.01) |
| G06F 16/40 | (2019.01) |

(52) U.S. Cl.
CPC .............. *H04L 65/60* (2013.01); *G06F 16/40* (2019.01); *H04N 21/26258* (2013.01); *H04N 21/4358* (2013.01); *H04N 21/44029* (2013.01); *H04N 21/8456* (2013.01); *H04N 21/85406* (2013.01)

(58) Field of Classification Search
CPC combination set(s) only.
See application file for complete search history.

(56) References Cited

U.S. PATENT DOCUMENTS

| 2010/0169303 | A1 | 7/2010 | Biderman et al. |
| 2011/0173345 | A1 | 7/2011 | Knox et al. |
| 2011/0296048 | A1 | 12/2011 | Knox et al. |
| 2012/0124179 | A1* | 5/2012 | Cappio ................. H04L 65/104 709/219 |
| 2012/0254456 | A1* | 10/2012 | Visharam ........... H04N 21/2343 709/231 |

(Continued)

FOREIGN PATENT DOCUMENTS

| CN | 102739 A | 10/2012 |
| WO | 2010/108053 A1 | 9/2010 |

(Continued)

OTHER PUBLICATIONS

Rubio Romero, Luciano. "A dynamic adaptive HTTP streaming video service for Google Android." (2011).*

(Continued)

*Primary Examiner* — Caroline H Jahnige
(74) *Attorney, Agent, or Firm* — Chernoff, Vilhauer, McClung & Stenzel, LLP

(57) ABSTRACT

Provided herein are systems and methods that allow for converting or translating Dynamic Adaptive Streaming over HTTP (DASH) to HTTP Live Streaming (HLS) and vice versa.

9 Claims, 9 Drawing Sheets

(56) References Cited

U.S. PATENT DOCUMENTS

2012/0284804 A1* 11/2012 Lindquist ............ H04L 63/0428
726/29
2012/0311094 A1* 12/2012 Biderman .............. H04N 5/783
709/219

FOREIGN PATENT DOCUMENTS

WO 2011/090715 A2 7/2011
WO 2012/166813 A1 12/2012

OTHER PUBLICATIONS

PCT Search Report & Written Opinion, RE; Application #PCT/US2013/046909; dated May 15, 2014.
Official Action RE: Korean Application No. 10-2015-7024811, dated Jul. 25, 2016.
Official Action, RE: Canadian Application No. 2,903,319, dated May 4, 2018.
T. Stockhammer (Qualcomm, Inc), "MPEGs Dynamic Adaptive Streaming over HTTP (DASH)—Enabling Format for Video Streaming Over the Open Internet", Webinar at EBU, pp. 1-30, https://www.w3.org/2011/09/webtv/slides/W3C-Workshop.pdf, Nov. 22, 2011.
Luciano Rubio Romero, "A Dynamic Adaptive HTTP Streaming Video Service for Google Android", School of Information and Communication Technology (JCT); Royal Institute of Technology (KTH); Stockholm, Sweden, Master of Science Thesis, pp. 1-118, http://www.diva-portal.org/smash/get/diva2:507848/FULLTEXT01.pdf, Oct. 6, 2011 (Oct. 6, 2011).
Thomas Stockhammer (Qualcomm Incorporated), "MPEG's Dynamic Adaptive Streaming", Webinar at EBU, pp. 1-30, https://www.w3.org/2011/09/webtv/slides/W3C-Workshop.pdf, Nov. 22, 2011 (Nov. 22, 2011).
"Dynamic Adaptive Streaming over HTTP", Wikipedia, https://web.archive.org/web/20130117095852/https://en.wikipedia.org/wiki/Dynamic_Adaptive_Streaming_over_HTTP, Jan. 11, 2013 (Jan. 11, 2013).
"DASH Streaming Support" and followed comments, GPAC, https://gpac.wp.imt.fr/2012/02/01/dash-support/, on and before Dec. 27, 2012 (Dec. 27, 2012).

* cited by examiner

DEVICES, SYSTEMS, AND METHODS FOR CONVERTING OR TRANSLATING DYNAMIC ADAPTIVE STREAMING OVER HTTP (DASH) TO HTTP LIVE STREAMING (HLS)

FIELD

The disclosure relates generally to the field of data transmission over digital networks, and more specifically to systems, devices and methods for converting or translating Dynamic Adaptive Streaming over HTTP (DASH) to HTTP Live Streaming (HLS) and vice versa.

BACKGROUND

By way of background, Internet Protocol Television ("IPTV") is a system in which digital television service is delivered by using internet protocol over a network infrastructure, which may include delivery by a broadband connection. A general definition of IPTV is television content that, instead of being delivered through traditional broadcast and cable formats, is received by the viewer through the technologies used for computer networks.

For residential users, IPTV is often provided in conjunction with Video on Demand ("VOD") and may be bundled with internet services such as web access and Voice over Internet Protocol ("VoIP"). In businesses, IPTV may be used to deliver television content over corporate Local Area Networks ("LANs").

IPTV covers both live TV (e.g., multicasting) as well as stored video (e.g., VOD). The playback of IPTV generally requires either a personal computer or a set-top box connected to a TV. Video content is typically compressed using either a MPEG-2 or a MPEG-4 codec and then sent in a Moving Pictures Expert Group ("MPEG") transport stream delivered via IP multicast in case of live TV or via IP Unicast in case of VOD. IP multicast or IP multicast protocol is a method in which information or content can be sent to multiple computers at the same time. In IP multicast protocol, each program channel (Px) may be defined as one multicast group, with the client watching the program via Internet Group Management Protocol's ("IGMP's") join/leave commands. IGMP is described in further detail in IETF Standard, RFC3376, "Internet Group Management Protocol, Version 3", October 2002, incorporated herein by reference in its entirety.

Generally, in most broadband services, (e.g., Digital Subscriber Line ("DSL") using twisted telephone wire or cable modem using coaxial cable), the last mile between an edge router and home gateway (hereinafter referred to as "the last mile" or "the last mile bandwidth") is the bottleneck of bandwidth availability. For example, the AT&T U-verse service is limited to offer only 2 High Definition ("HD") and 2 Standard Definition ("SD") channels simultaneously due to DSL bandwidth limitations. This last mile bandwidth availability varies depending upon the physical distance and the signal quality (impairments) from home to home.

Adaptive Bit Rate (ABR) streaming is a technology that combines aspects of streaming and progressive download to provide streaming of media content by breaking the content into a sequence of small HTTP-based file segments, each segment containing a short interval of playback time of a content that is potentially many hours in duration, such as a movie or the live broadcast of a sports event. An ABR player provides streaming playback by requesting an appropriate series of segments as determined by a manifest or playlist file and user requests, such as play, pause, rewind, etc. For example, the user may use HTTP Get or Byterange requests to obtain such media segments.

SUMMARY

Accordingly, there are provided herein systems and methods that allow for converting or translating Dynamic Adaptive Streaming over HTTP (DASH) to HTTP Live Streaming (HLS) and vice versa In a first aspect, a method of translating dynamic adaptive streaming over HTTP (DASH) to HTTP live streaming (HLS) is disclosed, the method comprising: receiving a media presentation description (mpd) file from a DASH server; extracting content from the mpd file; building a manifest file from the extracted content; and providing the manifest file to an HLS client.

In a second aspect, a converter system is disclosed, the system comprising: a processor configured to load and execute instructions from a translator module; and said translator module configured to: receive a media presentation description (mpd) file from a DASH server; extract content from the mpd file; build a manifest file from the extracted content; and provide the manifest file to an HLS client.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

In the past few decades, advances in the related fields of video compression and video transmission systems have led to the widespread availability of digital video programs transmitted over a variety of communication systems and networks. Most recently, new technologies have been developed that have allowed television programs to be transmitted as multicast, e.g., IP multicast, digital bit streams of multiplexed video and audio signals delivered to users or client subscribers over packet switched networks.

Adaptive Bit Rate (ABR) streaming is a technology that works by breaking the overall media stream into a sequence of small HTTP-based file downloads, each download loading one short segment of an overall potentially unbounded transport stream. As the stream is played, the client (e.g., the media player) may select from a number of different alternate streams containing the same material encoded at a variety of data rates, allowing the streaming session to adapt to the available data rate. At the start of the streaming session, the player downloads/receives a manifest containing the metadata for the various sub-streams which are available. Since its requests use only standard HTTP transactions, Adaptive Bit Rate streaming is capable of traversing a firewall or proxy server that lets through standard HTTP traffic, unlike UDP-based protocols such as RTP. This also allows a content delivery network (CDN) to readily be implemented for any given stream. ABR streaming methods have been implemented in proprietary formats including HTTP Live Streaming (HLS) by Apple, Inc. and HTTP Smooth Streaming by Microsoft, Inc.

Figure 1:
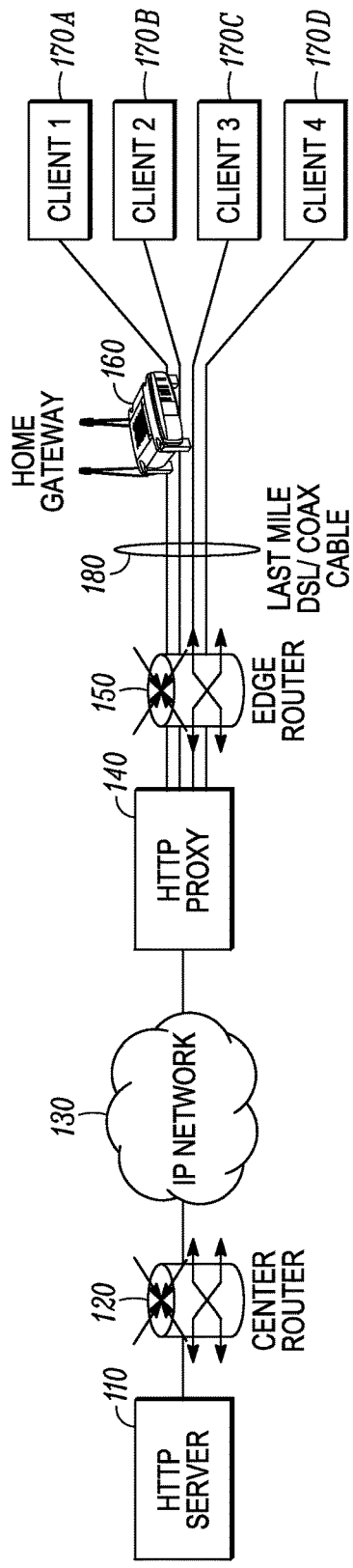
FIG. 1 is a functional block diagram illustrating an example flow of content in a system from a hypertext transfer protocol (HTTP) server to a plurality of end users or clients in accordance with an embodiment.

Referring to FIG. 1, an example flow of content in a system 100 from a content server to a plurality of end users or clients is shown. System 100 generally includes a content server (shown as HTTP server 110), a core router 120, an IP distribution network 130, an HTTP proxy server 140, an edge router 150, a home gateway 160, and one or more clients 170*a*, 170*b*, 170*c*, 170*d*. Also shown is a last mile network 180 located between edge router 150 and home gateway 160. As explained above, the last mile network 180 is generally the bottleneck of bandwidth availability in system 100.

As will be understood by those of skill in the art, HTTP server 110 generally provides the content for system 100. Content may include, for example, audio, video, or other data information provided in, e.g., packet format. Core router 120 may generally receive packet content from HTTP server 110 and reads the address information in the packets to determine their ultimate destination. Then, using information in, e.g., a routing table or routing policy, core router 120 can direct the packets to IP network 130. HTTP server 110 and the method of delivery of its content will be provided below with reference to FIG. 2.

As used herein, a "core router" is an IP router that routes IP single-cast and multi-cast packets in the "core" or of the IP distribution network. Edge routers connect to the core network. Generally, these core routers are managed by "backbone" Wide Area Network ("WAN") service providers. Interconnection bandwidths may be in the 10's of Gigabits (or much more) and run switching protocols such as Multi-Protocol Label Switching ("MPLS").

IP network 130 may generally be a network of one or more computers using Internet Protocol for their communication protocol. Similar to core router 120, edge router 150 can direct packets from IP network 130.

In some embodiments, the HTTP proxy server 140 operates as an edge agent of HTTP server 110. HTTP proxy server 140 may be configured to save or cache what HTTP server 110 transmits and avoid duplication of transmissions if more than one client 170 sends a request for content. For example, client 170*a* may send a request for content X. HTTP proxy server 140 may receive the request first and relay the request to HTTP server 110. HTTP server 110 may reply with content X via HTTP proxy server 140. HTTP proxy server 140 may transmit content X to client 170*a*, and in some embodiments, may store content X in its cache memory. When client 170*b* requests the same content X, HTTP proxy server 140 can transmit it immediately, without requesting the content from HTTP server 110.

As used herein, an "edge router" is an IP router that connects access routers to the core network and routes IP single-cast and multi-cast packets in the "edge" of the IP distribution network. Edge routers are generally managed by Internet Service Providers ("ISP") and may still be considered the WAN part of the network, but in general not the "backbone". Interconnection bandwidths to access networks vary over a wide range depending on last mile bandwidth and are generally in the Megabit to multi-Megabit range for residential access networks. Bandwidths for enterprises (e.g., commercial business) can be significantly larger.

When transmitting data packets over a network, a last head-end (or central office, point of presence, corporate gateway, or the like) is typically reached, this services a number of users on a data channel, with a head-end router. Such data channels having a single head-end serving a number of users are sometimes referred to as shared data channels. A head-end router is at the "head-end" of a given shared channel and serves as the communications interface with external networks. In this capacity, head-end router routes data packets received to the appropriate user and also prioritizes and schedules data packets for routing to users. In some embodiments, edge router 150 may comprise a head-end router. In some embodiments, core router 120 may comprise a head-end router. In such embodiments, core router 120 may serve as an entry point to the "managed" part of the overall network.

After a data packet is received by the head-end, the head-end router then passes the data onto the appropriate user on the shared channel, e.g., home gateway 160. A bottleneck can occur at this point if the available bandwidth is insufficient to satisfy the demand (e.g., transmission bandwidth on the channel itself or transmission and/or processing bandwidth of the router or head-end), resulting in queuing of "downstream" packets (e.g., packets destined for a user of the shared channel serviced by the head-end).

As an example, in the AT&T UverseSM service, there is usually a head-end router and a kiosk on the street with VDSL2 DSL transmitters. It is the bandwidth between the head-end router and the gateway in the home that, in general, is the congested part of the network.

For example, a plurality of users may be attached to a given head-end, which itself is coupled to IP network 130. One of the users may request a program from HTTP server 110. This program may be routed through the IP network 130 in the form of packets, and ultimately delivered to the user's own head-end. The head-end then typically immediately routes the packets to the recipient/user with the head-end router, if possible, or queues them in a buffer (typically, a first-in, first out (FIFO) buffer) if other packets are currently occupying the shared channel.

In some embodiments, home gateway 160 is a residential local area network ("LAN") for communication between digital devices typically deployed in the home, e.g., personal computers and accessories (e.g., printers and mobile computing devices). It should be appreciated that home gateway 160 may include all or a portion of digital devices within a user's home. Alternatively, home gateway 160 may be defined to include a broader range of devices, such as a set of homes within a community, etc.

Referring back to Clients 1-4 170*a-d*, as shown, Client 1 170*a* and Client 2 170*b* are part of the same LAN. For example, Client 1 170*a* and Client 2 170*b* may be a computer and a set top box for television operating within a first user's home. Client 3 170*c* may be a set top box operating within a second user's home and Client 4 170*d* may be a set top box operating within a third user's home.

Because the last mile bandwidth availability varies depending on the physical distance, signal quality from home to home (e.g., Client 1-2 170*a-b* and Client 3 170*c* and Client 4 170*d*), and number of active users, it may be desirable to adjust the content compression parameters accordingly to provide the committed service to all homes. However, when more bandwidth is available, it would be preferable to deliver improved quality to active users by further adjusting the content compression. This may be achieved, in some embodiments, through adaptive switching of content prepared with multiple bit rates. Alternately, in an example, when Clients 2-4 170*b-d* are not active, Client 1 170*a* may utilize the whole pipe solely. Adaptive switching of content to a higher bit rate for Client 1 170*a* may be performed in such an instance.

Figure 2:
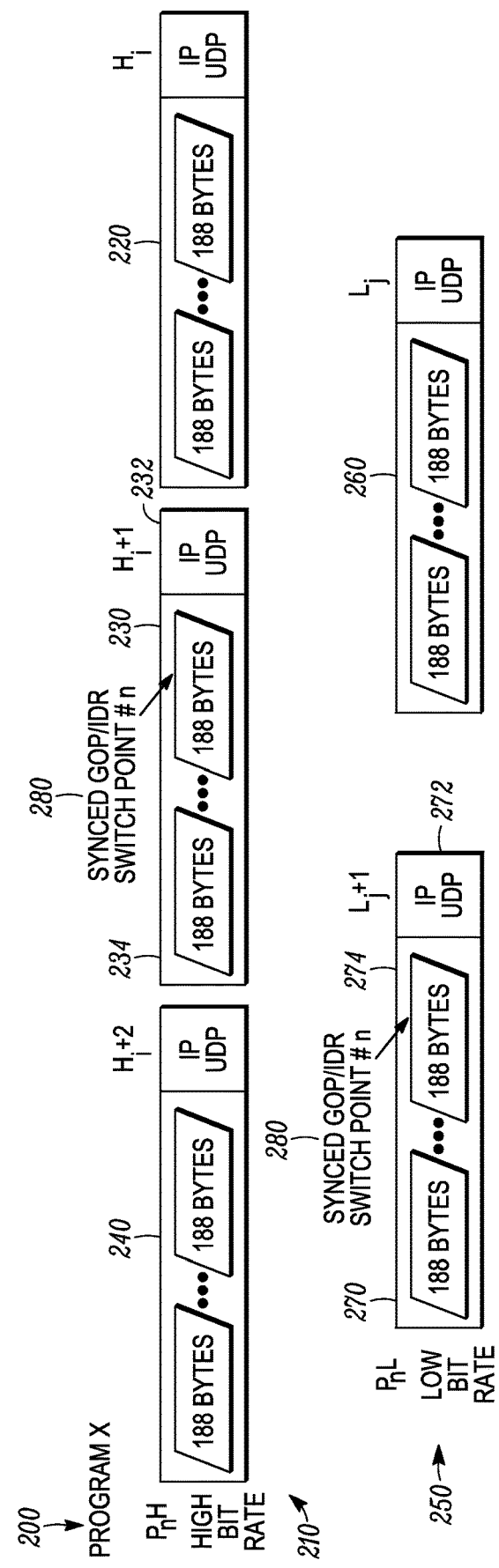
FIG. 2 is a functional block diagram illustrating an example structure a program encoded in multiple bit rates in accordance with an embodiment.

Referring now to FIG. 2, a functional block diagram illustrating an example structure of a program encoded in multiple bit rates is shown. In FIG. 2, an MPEG-2 transport packet having a length of 188 bytes is shown. A desirable feature of MPEG-2 encoding is its ability to remove redundancy, not only within a frame, but also among a group of frames. Generally, MPEG-2 uses three frame types (I, P, and B) to represent video. A group of pictures ("GOP") setting defines the pattern of the three frame types used.

The intra-frame ("I-frame") is also known as the key frame. Every GOP includes one I-frame. The I-frame is the only MPEG-2 frame type which can be fully decompressed without any reference to frames that precede or follow it. It is also the most data-heavy, requiring the most bandwidth or bitrate. If a user wants to place an I-frame at a scene change or some other specific frame location, the user must manually set it. This is known as a forced I-frame.

The predicted-frame ("P-frame") is encoded from a "predicted" picture based on the closest preceding I- or P-frame. P-frames typically require much less bandwidth or bitrate than do I-frames because they reference a preceding I- or P-frame in the GOP.

Both I-frames and P-frames are also known as reference frames, because a bi-directional-frame ("B-frame") may refer to either one or both frame types. The B-frame is encoded from an interpolation of succeeding and preceding reference frames, either I-frame or P-frame. B-frames are the most storage-efficient MPEG-2 frame type, requiring the least amount of bandwidth or bitrate.

As is known to those of ordinary skill in the art, the use of adaptive streaming may prepare content e.g., video content, such that the same content is encoded in multiple bit rate streams. Generally, the higher the bit rate, the better the content quality. Any suitable generic video encoding process, e.g., software and hardware, known by one skilled in the art may be utilized. In some embodiments, the encoding is performed by multi-bit rate transcoder and the processed media contents are stored in the HTTP server box.

In FIG. 2, a program X 200 is shown as being encoded in multiple bit rates. In this particular example, program X 200 may have a high bit rate structure stream 210 and a low bit rate structure stream 250. Consequently, for each program Pn there will be PnH and PnL structure (e.g., for program 1, there will be P1H, P1L; for program 2 there will be P2H, P2L, etc.).

In some embodiments, in the encoding process, the GOP/I-frame alignment is maintained amongst the streams 210, 250. In some embodiments, the I-frame is an instantaneous decoder refresh ("IDR") frame. An IDR frame is a special kind of I-frame used in MPEG-4 AVC encoding. Generally, frames following an IDR frame may not refer back to frames preceding the IDR frame. For seamless switch from one bit rate to another, an IDR frame may be desirable. As used herein, "alignment amongst streams" means the IDR frames with same presentation timestamp ("PTS") on all bit rate streams represent identical scene content.

In the example of FIG. 2, in high bit rate data structure stream 210 there are three packets shown 220, 230 and 240. Each packet 220-240 includes a similar structure, with an IP or User Datagram Protocol ("UDP") header portion 232 and the transport packet portion 234, being shown for packet 230. Similarly, in low bit rate data structure stream 250, there are two packets shown 260 and 270. Each packet 220-240 includes a similar structure, with an IP or User Datagram Protocol ("UDP") header portion 272 and the transport packet portion 274, being shown for packet 270.

Because GOP/I-frame alignment is maintained amongst the streams 210, 250, the client can seamlessly switch from one bit rate stream to another when playing back if switching occurs at a suitable or predetermined switching point. In some embodiments, a suitable switching point may be at a defined boundary of the closed GOP/I-frame (e.g., at the beginning of the header portion 232, 272), shown as reference numeral 280. In some embodiments, a switching identifier or switching point may be carried as the first media frame in a media payload packet in an IP packet.

In some embodiments, if the HTTP server 110 is streaming content to a first user at a high bit rate, e.g., stream 210, and a second user requests bandwidth, the second user is allocated bandwidth if it is available after the first user is allocated its bandwidth. The client 170 decides which bit rate it should ask for, so if there is available bandwidth to accommodate a higher bit rate, the client 170 will be allocated the higher bit rate. With adaptive streaming, a user or client 170 can view better video when bandwidth is sufficient, (e.g., less program channels or better last mile connection), or get more channels with low bit rate (but still acceptable) program quality.

Figure 3:
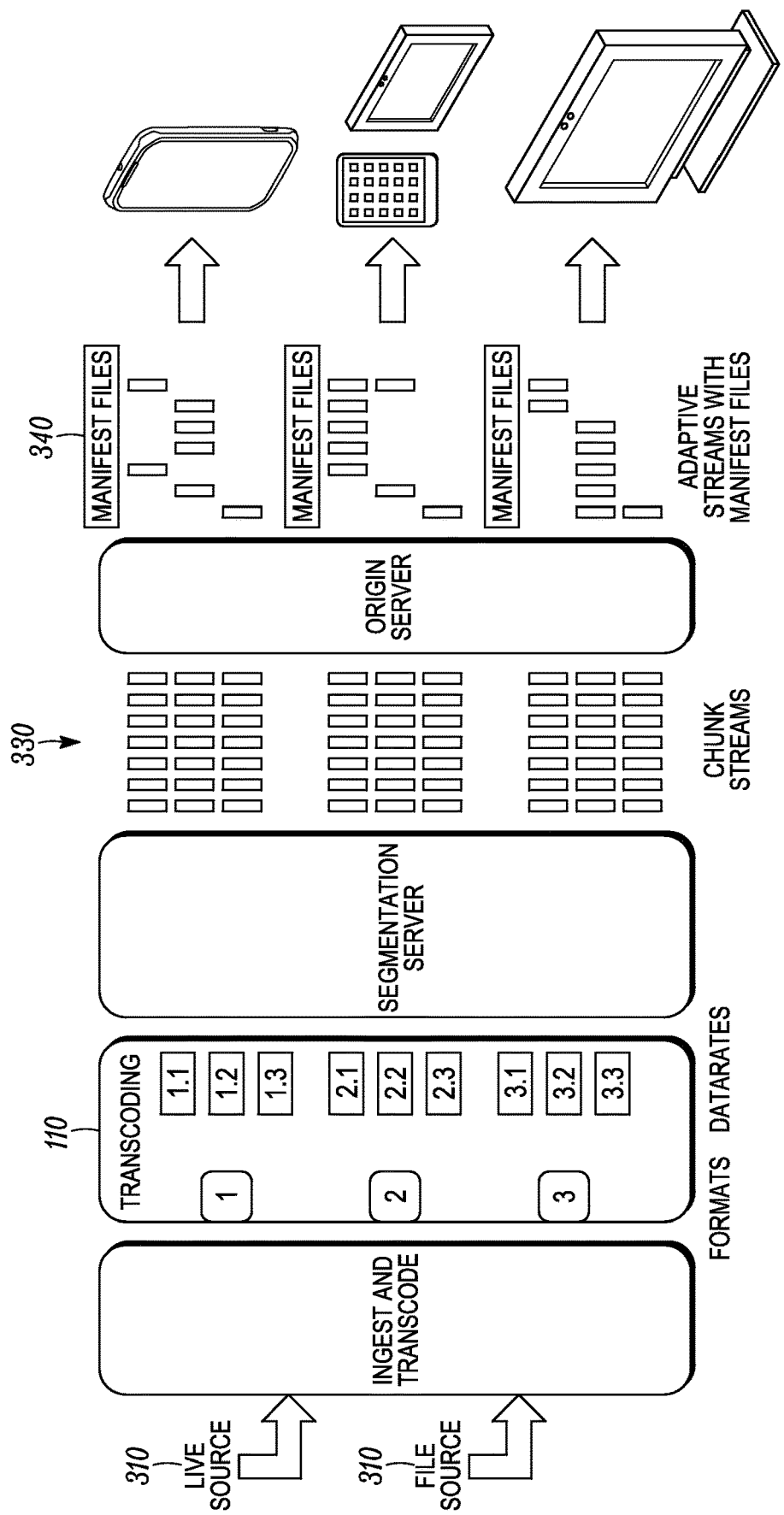
FIG. 3 is a functional block diagram illustrating an example process for ingesting, transcoding, segmentation and adaptive streaming in accordance with an embodiment.

Referring now to FIG. 3, content prepared by and/or delivered from HTTP server 110 may be classified as HTTP adaptive streaming. Adaptive streaming or (also referred to as adaptive bitrate (ABR) streaming) operates by dynamically adjusting the play-out rate to stay within the actual network throughput to a given endpoint, without the need for rebuffering. So, if the network throughput suddenly drops, the picture may degrade but the end user still sees a picture.

Although adaptive streaming was originally developed for over-the-top video applications over unmanaged networks, it also brings advantages to managed network applications. For example, during periods of network congestion, operators can set session management polices to permit a predefined level of network over-subscription rather than blocking all new sessions (such as when last mile bandwidth availability is too limited to allow another client to join). This flexibility will become more important as subscribers demand higher quality feeds (e.g., 1080p and 4K).

As used herein, HTTP adaptive streaming is the generic term for various implementations: Apple HTTP Live Streaming (HLS), Microsoft IIS Smooth Streaming, Adobe HTTP Dynamic Streaming (HDS), and MPEG DASH.

Although each of the various implementations of HTTP adaptive streaming is different, they all have a set of common properties. For example, still referring to FIG. 3, source content 310 is transcoded in parallel at multiple bit rates (e.g., multi-rate coding) in a transcoding process 320. Each bit rate is called a profile or representation. As shown, the source content 310 may comprise media content such as live source content and/or file source content. For example, the file source content may include movies, TV programs, etc. The live source content may include live streaming format, such as a live broadcast of a sports program or game.

Encoded content is divided into fixed duration segments (e.g. chunks) in a segmentation process 330. The segments or chunks are typically between two and 10 seconds in duration, although they may be longer or shorter. In some embodiments, shorter segments reduce coding efficiency while larger segments impact speed to adapt to changes in network throughput.

A manifest file is created and updated as necessary to describe the encoding rates and URL pointers to segments in a manifest file creation process 340. As used herein, a manifest file or playlist describes how content is prepared, how many different encoding bitrates, and for each bitrate stream, how long a segment is, and where to obtain each segment of each bitrate stream.

In some embodiments, the client uses HTTP to fetch segments from the network, buffer them and then decode and play them. The client may utilize one or more algorithms designed to select the optimum profile so as to maximize quality without risking buffer underflow and stalling (e.g., rebuffering) of the play-out. For example, each time the client fetches a segment, it may choose the profile based on the measured time to download the previous segment.

While HTTP adaptive streaming has been discussed generally, it should be appreciated that there has been a push for standardization of HTTP adaptive streaming given that there various implementations, as provided above. For example, Moving Picture Experts Group (MPEG) Dynamic Adaptive Streaming over HTTP (MPEG-DASH) may become a popular choice. While HLS uses MPEG-2 transport stream (TS) format, Smooth Streaming uses MPEG-4 Part 14 (MP4). MPEG-DASH supports both TS and MP4 container formats. Smooth Streaming and MPEG-DASH include full support for subtitling and trick modes (e.g., fast-forward, etc.), whereas HLS is limited in this regard. MPEG-DASH enables common encryption, which simplifies the secure delivery of content from multiple rights holders and multiple devices.

Another difference is the way in which MPEG-DASH and Smooth Streaming play-out is controlled when transmission path conditions change. For example, HLS uses manifest files that are effectively a playlist identifying the different segments so when path impairment occurs, the selection of the uniform resource locator (URL) from the manifest file adapts so that the lower bit-rate segments are selected. In Smooth Streaming, the client uses time stamps to identify the segments needed, thus gaining efficiencies. Both HLS and Smooth Streaming handle files in subtly different ways, each claiming some efficiency advantage over the other. Both use HTTP, which has the ability to traverse firewalls and network address translation.

Figure 4:
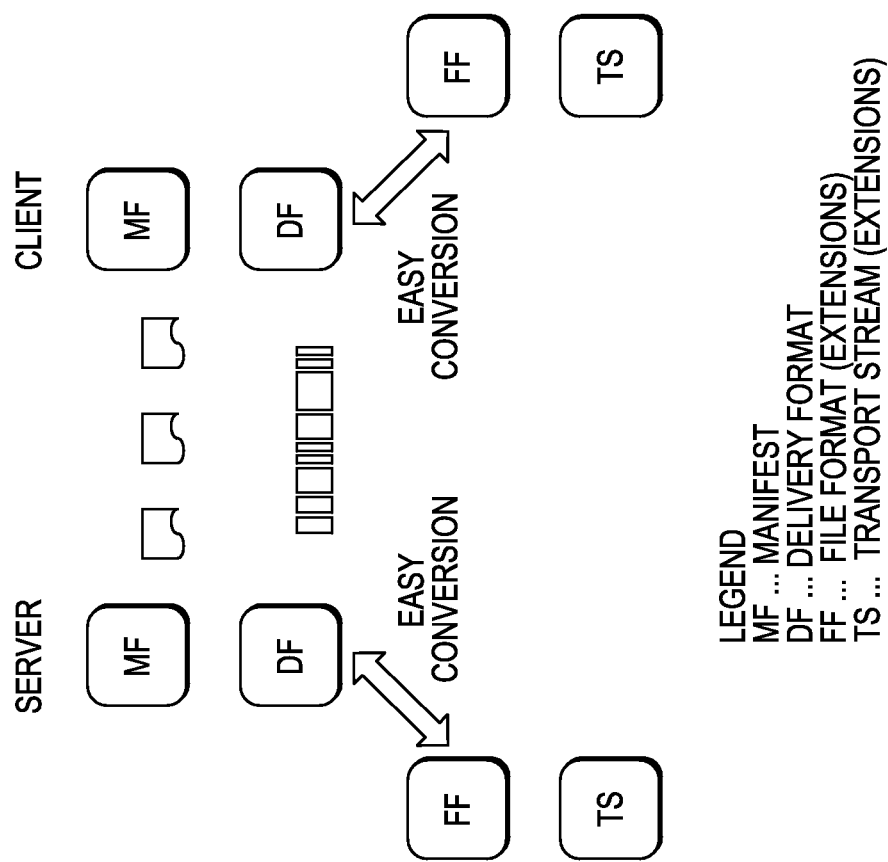
FIG. 4 is a functional block diagram illustrating an example flow of data in dynamic adaptive streaming over HTTP (DASH) in accordance with an embodiment.

There are currently a number of initiatives aimed at large parts of the overall solution for streaming video. MPEG has standardized a Manifest File (MF), a Delivery Format (DF), and a means for easy conversion from/to existing File Formats (FF) and Transport Streams (TS), as illustrated in FIG. 4. Specifically, MPEG-DASH has the potential to simplify and converge the delivery of IP video and provide a rich and enjoyable user experience.

Figure 5:
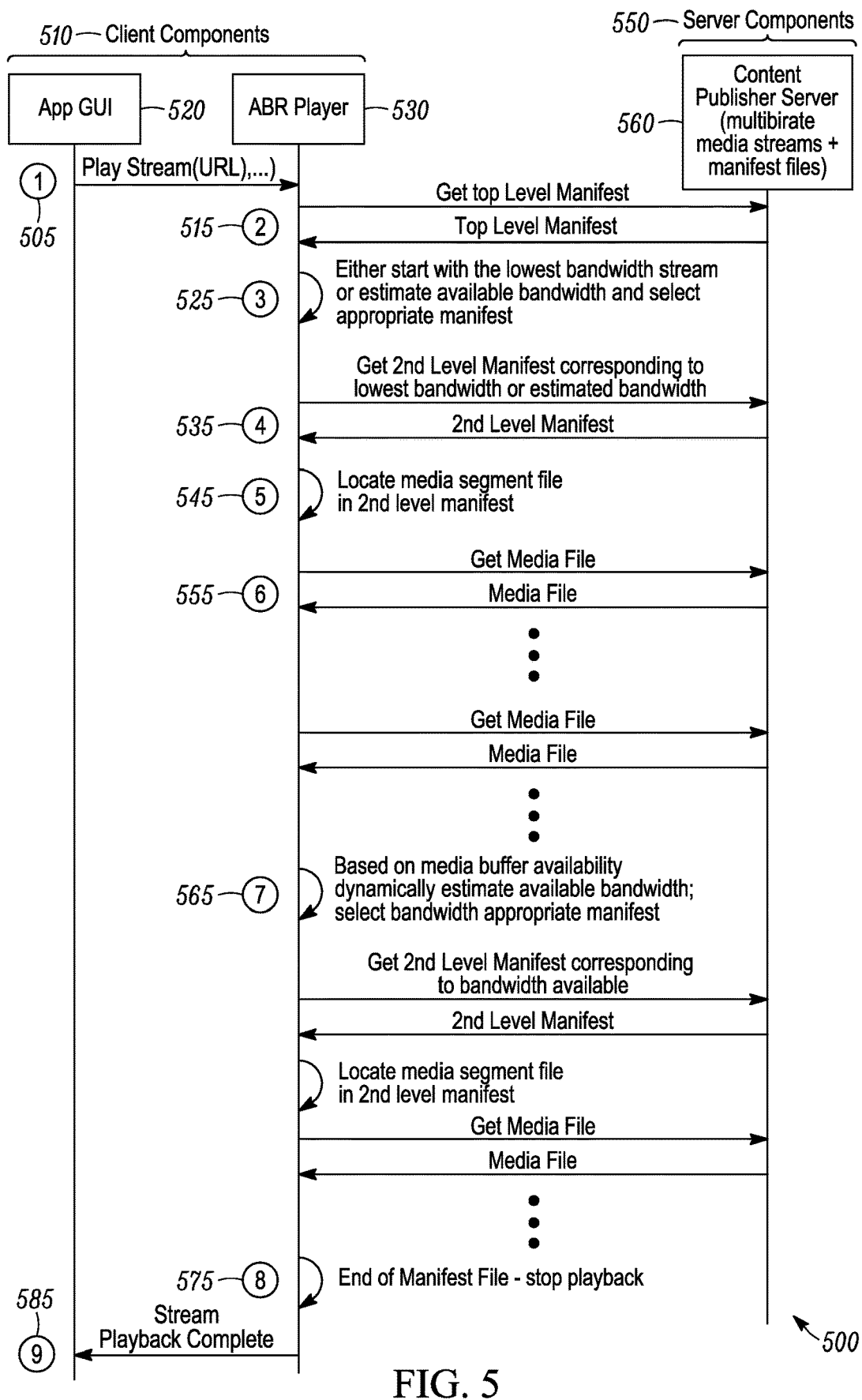
FIG. 5 illustrates a system that includes client components and server components in communication with each other and the message flows for typical adaptive streaming in accordance with embodiments of the disclosure.

Referring to FIG. 5, a system 500 is shown that includes client components 510 and server components 550 in communication with each other and the message flows for typical adaptive bitrate (ABR) streaming (e.g., HLS). Flows related to security between the client components 510 and server components 550 have been omitted for clarity.

Client components may include an application graphic user interface (App GUI) 520 and adaptive bitrate (ABR) player 530. Server components 550 may include a content publishing server 560, which may be configured to store or produce multi-bitrate media steams and manifest files.

In a first step 505, a user navigates through movie listing and selects an audiovisual media asset for viewing. In some embodiments, the audiovisual media asset is linked to a uniform resource locator (URL) pointing to a high level playlist.

In a next step 515, the ABR player 530 may be configured to request/receive a top or high level manifest file for the audiovisual media asset that includes information about the ABR profiles and links to the manifests corresponding to each media bandwidth.

In a next step 525, the ABR player 530 may be configured to look at the high level manifest and either starts by requesting the lowest bandwidth manifest file or optionally may do some bandwidth availability estimation and select the corresponding bandwidth manifest file.

In a next step 535, ABR player 530 may be configured to request/receive a 2nd level manifest for the corresponding bandwidth. In a next step 545, ABR player 530 may be configured to determine the media segment file in the 2nd level manifest.

In a next step 555, ABR player 530 may be configured to request/receive media segment files in succession. In a next step 565, ABR player 530 may be configured to continuously monitor the media buffer fullness to determine if it is necessary to request lower or higher bandwidth media segment representations. For example, if the bandwidth conditions change, the player may be configured to select the corresponding bandwidth manifest file and select media segments in succession.

In a next step 575, when the end of the manifest file is reached, ABR player 530 may be configured to signal the App GUI 520 that playback of the audiovisual media asset is complete. Thus signaling that the stream playback is complete is shown as step 585.

As mentioned above, there is a push to standardize to MPEG-DASH. However, currently deployed end devices only support the HLS (HTTP Live Streaming) protocol to playback the same adaptive bitrate content. Thus, this disclosure solves this problem by implementing a protocol translator (e.g., converter), thereby allowing end devices capable of playing content only from an HLS server to now play back content from a DASH server.

Figure 6:
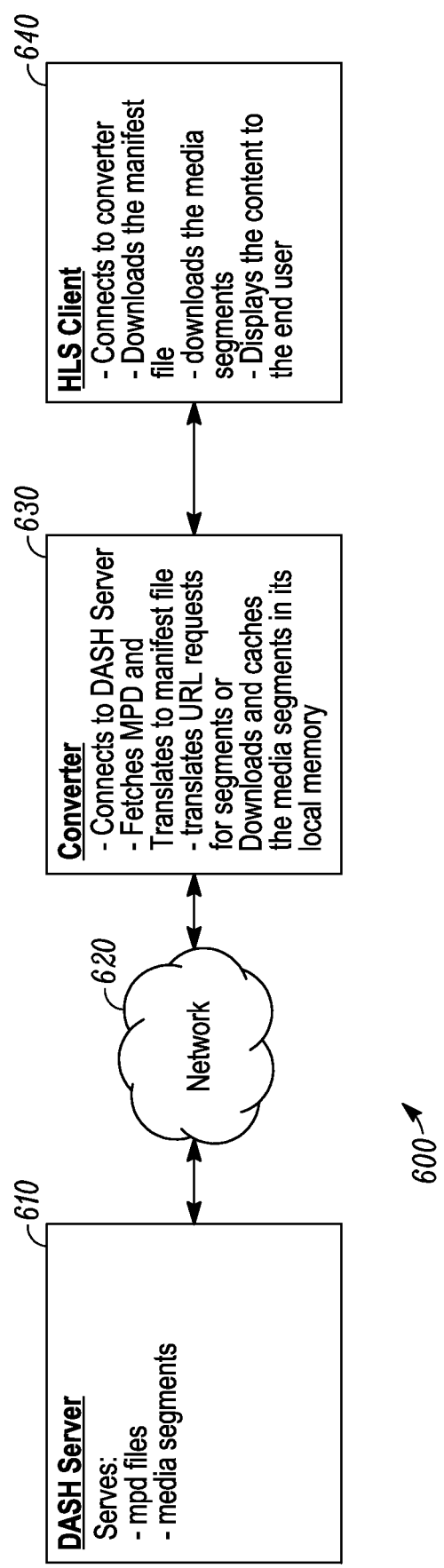
FIG. 6 shows an example system with a converter in place.

FIG. 6 shows an example system 600 with such a converter in place. In FIG. 6, the converter 630 is placed in between a DASH server 610 and HLS client 640. This converter 630 can be included into the application code (e.g., as a software module) of the client device (e.g., at HLS client) or as a separate standalone server, as shown.

DASH server 610 may be configured to serve or support media presentation description (mpd) files and/or media segments. It may be appreciated that the mpd file in DASH corresponds to a manifest file in HLS (discussed above with reference to FIGS. 4 and 5). As shown, DASH server 610 may be configured to communicate with a Network 620 by e.g., receiving and/or transmitting data. Network 620 may be any type of network, including for example, the internet, cable modem network, managed service provider network, content distribution network (CDN) and the like. Network 620 may be wired or wireless.

Converter 630 may be configured to communicate with DASH server 610, such as via Network 620, by receiving and/or transmitting data. In some embodiments, converter 630 may be configured to fetch mpd files and translate the mpd files into corresponding manifest files (provided in more detail with reference to FIGS. 7 and 8). In some embodiments, converter 630 may be configured to fetch manifest files and translate the manifest files into corresponding mpd files.

Once converter 630 has translated the manifest file to the corresponding mpd file or translated the mpd file to the corresponding manifest file, converter 630 may be configured to translate URL requests for segments or downloads. In some embodiments, the converter 630 may cache or save the requested segments or downloads in memory.

HLS client 640 may be configured to communicate with converter 630 by e.g., receiving and/or transmitting data. In some embodiments, HLS client may be configured to download manifest files and media segments from converter 630. HLS client 640 may also be configured to display the content to end users.

Figure 7:
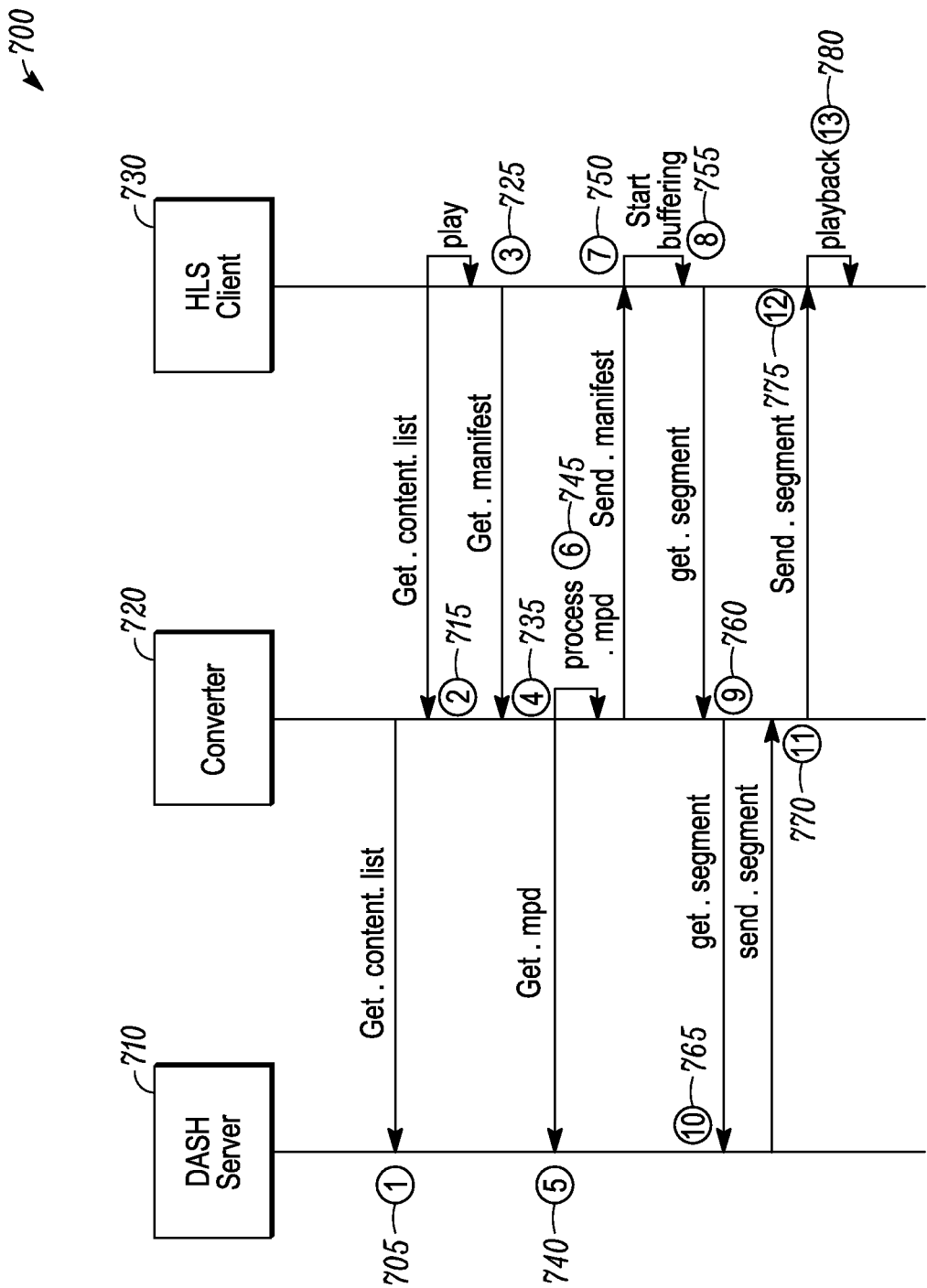
FIG. 7 shows an example system that includes a DASH server, a converter, and an HLS client in communication with each other and example message flows between components.

FIG. 7 shows an example system 700 that includes a DASH server 710, a converter 720, and an HLS client 730 in communication with each other and example message flows between components. A general overview of the functionality of the components is provided first.

In some embodiments, converter 720 may be implemented that is configured to obtain the MPD file from the DASH server 710 and generate a local converted representation of this document into an HLS manifest file and makes it available to the HLS client 730. When the HLS client 730 requests media segments based on the URLs in the manifest file, the converter 720 is configured to translate them into URL requests to the segments stored on the DASH server 710.

In some embodiments, the converter 720 may be configured to obtain the MPD from the DASH server 710, evaluate the current bitrate that can be supported by the client device 730 and initiates the download of the segments from the DASH server 710 on behalf of the HLS client 730 and stores them in an internal buffer. The manifest files that are generated by this converter 720 may contain URLs to the content in this local buffer instead of the DASH server 710. The HLS client 730 may proceed to download the segments from the converter 720 and display the media to the end user. This will allow the converter 720 to identify the appropriate bitrate that the client can support and make only that bitrate available to it, thereby also abstracting that decision making functionality into the converter 720 instead of the HLS client 730.

In some embodiments, advanced functionality requested from the HLS client 730 such as trick play modes (pause, fast forward, rewind) may be implemented in a similar fashion, wherein the converter 720 may be configured to translate the incoming request in the HLS protocol into requests that match the requests DASH protocol and similarly translate the responses from the DASH server 710 into responses expected by the HLS client 730.

Still referring to FIG. 7, in a first step 705, converter 720 may be configured to request/receive or get a content list file from DASH server 710. In some embodiments, the converter 720 may be configured to cache or store the content list file in local memory. The content list file may include information such as a movie list or program list.

In a next step 715, HLS client 730 may be configured to request/receive the content list file from converter 720. For example a user can browse a list of movies or television shows and select on a menu item to retrieve.

Thereafter, at step 725, the HLS client 730 plays or displays the content list to a user. The user navigates through the content list and selects an audiovisual media asset for viewing. In some embodiments, the audiovisual media asset is linked to a uniform resource locator (URL) pointing to a playlist.

In a next step 735, the HLS client 730 may be configured to request from converter 720 a manifest file for the audiovisual media asset that includes information about program name, description, ratings, thumbnail, etc. and links to the manifests corresponding to each media bandwidth. In some embodiments, HLS client 730 may be configured to look at the manifest file and either starts by requesting the lowest bandwidth manifest file or optionally may do some bandwidth availability estimation and select the corresponding bandwidth manifest file.

In a next step 740, converter 720 may be configured to request/receive from DASH server 710 an mpd file corresponding to the requested manifest file. Upon receipt of the mpd file, at block 745, converter 720 may be configured to process or translate the mpd file into the requested manifest file.

In a next step 750, the converter 720 may be configured to send or transmit the requested manifest file to HLS client 730. Upon receipt of the manifest file, at block 755, HLS client 730 may be configured to begin buffering or saving the manifest file in e.g., local memory.

In a next step 760, HLS client 730 may be configured to request media segment files from converter 720. In a next step 765, converter 720 may be configured to request the corresponding media files from DASH server 710.

Thereafter, in step 770, DASH server 710 may be configured to send or transmit the media files to converter 720. At step 775, converter 720 may be configured to send or transmit the requested media files to HLS client 730. Upon receipt of the media files, at block 780, HLS client 730 may be configured to begin playback of the audiovisual media asset.

In some embodiments, steps 760, 765, 770, 775 may be performed in succession any number of time until the transfer of the audiovisual media asset is complete. In some embodiments, converter 720 and/or HLS client 730 may be configured to continuously monitor the media buffer fullness to determine if it is necessary to request lower or higher bandwidth media segment representations. For example, if the bandwidth conditions change, the converter 720 and/or HLS client 730 may be configured to select the corresponding bandwidth manifest file and select media segments in succession.

Figure 8:
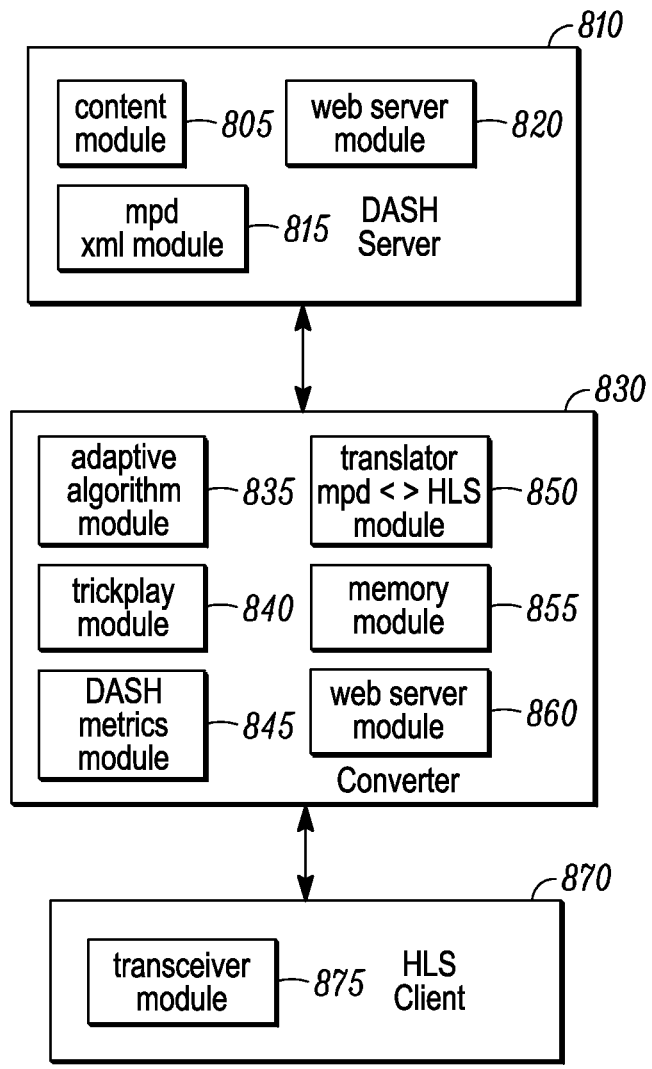
FIG. 8 shows example modules included in each of the DASH server, converter, and HLS client.

FIG. 8 shows example modules included in each of the DASH server 810, converter 830, and HLS client 870 which may be used to achieve the desired functionality described herein. For example, DASH server 810 may include a content module 805, an mpd xml module 815, and a web server module 820. The content module 805 represents the audio video content that is presented to the end user 170 when the user selects content for playback. The mpd xml module 815 handles the creation of mpd files corresponding to each piece of content and its variant bitrates. The web server module 820 is used to stream the mpd xml and content to a DASH client such as converter 830 or a device that is capable of playing back DASH formatted content.

Converter 830 may include an adaptive algorithm module 835, a trick play module 840, a DASH metrics module 845, a translator module 850, a memory module 855, and a web server module 860. In some embodiments, the adaptive algorithm module 835 may be configured to predict which rate/resolution of segment will be requested. In some embodiments, the DASH metrics module 845 may be configured to use feedback from the DASH server. The adaptive algorithm module 835 is used to analyze the bitrate observed by the client and make decisions on which segment to download next. The trick play module 840 handles requests by the end user to fast forward or rewind content playback by downloading the appropriate segments from the DASH server and making them available to the HLS client. The DASH metrics module 845 is assigned with the task of providing metrics (such as client buffer levels, bitrates requested, etc.) back to the DASH server. The translator module 850 is assigned to process the mpd xml file and convert it to an HLS manifest file and additionally/optionally perform content container format conversion (e.g., MP4 to TS) and DRM conversion. The memory module 855 is used to optionally pre-fetch and cache the segments so that the HLS client can request it from the converter 830 instead of directly from the DASH server. The web server module 860 is used to stream the HLS manifest file and the segments of audio video content to the HLS client 870.

HLS client 870 may include a transceiver module 875. In some embodiments, the transceiver module 875 may be configured to make and receive requests to the DASH converter. In some embodiments, the transceiver module 875 may be in communication with or integral to a display module (not shown), for displaying content to a user (e.g., via a touch screen graphic user interface (GUI)).

Figure 9:
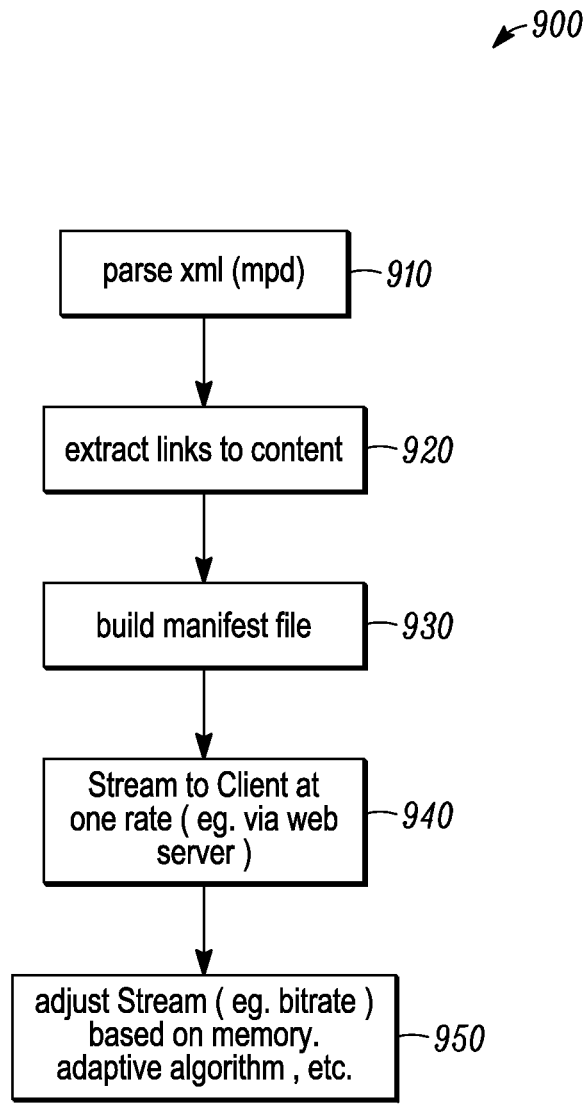
FIG. 9 shows an example process for translating from DASH to HLS.

FIG. 9 shows an example process 900 for translating from DASH to HLS. This example process provides a more general understanding of the communication shown in FIG. 7. In a first step 910, the converter 720 may be configured to parse certain items in the mpd file. In general, the mpd file is an xml file, and specific fields may be parsed.

In a next step 920, the converter 720 may be configured to extract links to content in the parsed fields. For example, the converter 720 may be configured to recognize fields in the mpd and remove and process the relevant URLs.

In a next step 930, the converter 720 may be configured to build or construct a corresponding manifest file from the links to content. As is known, manifest files have a predefined format, which include a sequence of lines of metadata and URLs. The converter 720 can produce this format using acquired information.

While shown explicitly, after step 930, there may be an optional step for content and DRM conversion. For example, as is known, DASH supports MP4 container format but HLS only supports TS (transport stream). The video and audio contained within are the same but the container formats are different. Without this conversion step, the HLS client (for example, iPad&) may not be able to play the content even if the HLS manifest files are generated by the converter. Similarly, the DRM schemes used/supported by DASH is a superset of what is supported by HLS. So, in that case as well, the converter will (if necessary) decrypt and re-encrypt or reuse the encryption but change the DRM signaling so that the HLS client will be able to play the content back.

At step 940, the converter 720 may be configured to stream the content to the client device 730 at a first bit rate, e.g., via a web server and optionally convert the media container format from MP4 to TS and DRM conversion from that published by the DASH server in the mpd to that supported by the HLS clients.

At step 950, the converter 720 may be configured to adjust the content stream (e.g. to a second bit rate, third bit rate, etc.). In some embodiments, the adaptive algorithm module 835 may be used to determine or predict which bit rate the client can support, and stream the determined bit rate to the client. For example, the first segment may be sent to a client at the lowest bit rate available. Thereafter, the adaptive algorithm module 835 may determine that the client can support a higher bit rate, and change the content stream to the client, accordingly.

Figure 10:
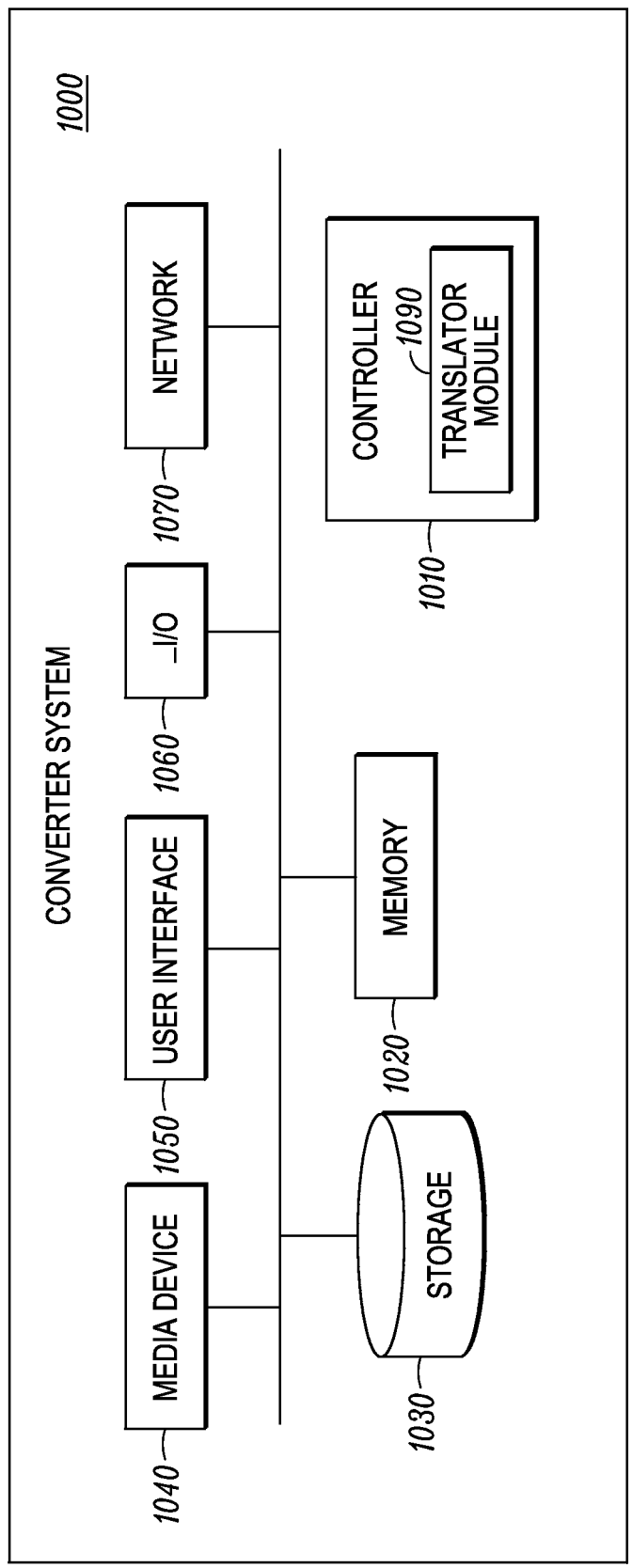
FIG. 10 shows an example functional block diagram illustrating a converter system in accordance with embodiments of the disclosure.

FIG. 10 is a functional block diagram illustrating an example converter system 1000 hosting the translator module 1090. The controller 1010 is a programmable processor and controls the operation of the computer system 1000 and its components. The controller 1010 loads instructions (e.g., in the form of a computer program) from the memory 1020 or an embedded controller memory (not shown) and executes these instructions to control the system. In its execution, the controller 1010 provides the translator module 1090 as a software system. Alternatively, this service can be implemented as separate hardware components in the controller 1010 or the converter system 1000.

Memory 1020 stores data temporarily for use by the other components of the converter system 1000. In one implementation, memory 1020 is implemented as RAM. In one implementation, memory 1020 also includes long-term or permanent memory, such as flash memory and/or ROM.

Storage 1030 stores data temporarily or long term for use by other components of the converter system 1000, such as for storing data used by the translator module 1090. Such stored data may include metadata, manifest files, etc. In one implementation, storage 1030 is a hard disk drive.

The media device 1040 receives removable media and reads and/or writes data to the inserted media. In one implementation, for example, the media device 1040 is an optical disc drive or SDCARD (secure digital cards as used in digital cameras).

In some embodiments, an optional user interface 1050 includes components for accepting user input from the user of the converter system 1000 and presenting information to the user. In one implementation, the user interface 1050 includes a keyboard, a mouse, audio speakers, and a display. The controller 1010 uses input from the user to adjust the operation of the converter system 1000.

The I/O interface 1060 includes one or more I/O ports to connect to corresponding I/O devices, such as external storage or supplemental devices (e.g., a printer or a PDA). In one implementation, the ports of the I/O interface 1060 include ports such as: USB ports, PCMCIA ports, serial ports, and/or parallel ports. In another implementation, the I/O interface 1060 includes a wireless interface for communication with external devices wirelessly.

The network interface 1070 includes a wired and/or wireless network connection, such as an RJ-45 or "Wi-Fi" interface (including, but not limited to 802.11) supporting an Ethernet connection.

The converter system 1000 includes additional hardware and software typical of computer systems (e.g., power, cooling, operating system), though these components are not specifically shown in FIG. 10 for simplicity. In other implementations, different configurations of the converter system can be used (e.g., different bus or storage configurations or a multi-processor configuration). Additionally, while FIG.

10 illustrates an example converter system 1000, a DASH server or HLS client may include similar components with different modules (e.g., from FIG. 8) being implemented.

Accordingly, the present disclosure is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions can be moved from one module or step to another without departing from the disclosure.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine readable storage media such as RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

What is claimed is:

1. A method of translating dynamic adaptive streaming over HTTP (DASH) to HTTP live streaming (HLS), the method comprising:
   receiving a request from an HLS client for content provided from a DASH server;
   in response to the request, obtaining a DASH media presentation description (mpd) file from the DASH server;
   extracting content from the DASH mpd file;
   building an HLS manifest file using the extracted content;
   providing the HLS manifest file to the HLS client;
   receiving a request from the HLS client for a trick play operation of said content and forwarding the request to the DASH server after translation into a DASH protocol request for the trick play;
   receiving from the DASH server a DASH protocol response for the trick play and forwarding the response to the HLS client after translating it to an HLS protocol response.

2. The method of claim 1, wherein predetermined fields in the mpd file are parsed.

3. The method of claim 2, wherein the extracting comprises extracting links to content in the parsed predetermined fields.

4. The method of claim 1, wherein the building a HLS manifest file comprises providing at least one line of metadata followed by one or more links.

5. The method of claim 1, further comprising: receiving a media segment file from the DASH server, the media segment file comprising media content.

6. The method of claim 5, further comprising: providing the media segment file to the HLS client.

7. The method of claim 6, wherein the providing the media segment comprises streaming media content to the HLS client at a first bitrate.

8. The method of claim 7, wherein the first bitrate is a lowest available bitrate.

9. The method of claim 7, the method further comprising: determining if the HLS client can receive a media segment at a higher bitrate, and if so, streaming media content to the HLS client at a second bitrate that is higher than the first bitrate.

* * * * *